United States Patent [19]

Deeg et al.

[11] 3,935,020

[45] Jan. 27, 1976

[54] FARADAY ROTATION GLASSES

[75] Inventors: Emil W. Deeg, Woodstock, Conn.; David A. Krohn; Robert E. Graf, both of Southbridge, Mass.

[73] Assignee: American Optical Corporation, Southbridge, Mass.

[22] Filed: Apr. 24, 1974

[21] Appl. No.: 463,490

[52] U.S. Cl.............. 106/54; 156/47 R; 156/47 Q
[51] Int. Cl.² .................. C03C 3/04; C03C 3/08
[58] Field of Search............... 156/47 R, 47 Q, 54; 252/62.51; 350/151

[56] References Cited
UNITED STATES PATENTS

| | | |
|---|---|---|
| 3,318,652 | 5/1967 | Berger et al. ............... 252/62.51 |
| 3,368,861 | 2/1968 | Rubinstein et al. ............. 350/151 |
| 3,420,601 | 1/1969 | Young et al. ................. 350/151 |
| 3,484,152 | 12/1969 | Robinson ..................... 350/151 |
| 3,654,172 | 4/1972 | Reade ....................... 252/301.4 F |
| 3,660,291 | 5/1972 | Stong ........................ 252/62.51 |

*Primary Examiner*—Winston A. Douglas
*Assistant Examiner*—Mark Bell
*Attorney, Agent, or Firm*—H. R. Berkenstock, Jr.; William C. Nealon

[57] ABSTRACT

Faraday rotation glasses exhibiting a high Verdet constant and a low susceptability toward devitrification are formed by introducing a high quantity of rare earth oxides into a borate glass base. The glasses can be melted under standard environmental conditions and may be made on a large scale.

5 Claims, No Drawings

FARADAY ROTATION GLASSES

BACKGROUND OF THE INVENTION

This invention is related to Faraday rotation glasses and is more particularly concerned with a new Faraday rotation glass which exhibits a high Verdet constant and low susceptibility toward devitrification.

Some optical materials are themselves optically active, that is, they rotate the plane of polarization of polarized light passing through them. Glass and some other similar substances are devoid of this property in their normal condition, but may exhibit this property when placed in a strong magnetic field. This property is called the Faraday effect. The polarized light must traverse the substance along the magnetic lines of force. The direction of rotation of the plane of polarization is reversed if the field is reversed but is the same with respect to the observer whether the light is going or coming, so that a beam passing through the material in one direction and reflected back through has its rotation doubled. This is in contrast with the normal optically active material wherein the double pass through the optically active material serves to negate the rotational effect in the material.

Glasses exhibiting the Faraday rotation effect have found considerable use in various optical areas, for example, as high speed photographic shutters and in various laser optical systems. As the uses of laser materials have increased in recent years the interest in Faraday rotating materials has likewise increased.

It is known that cerium containing glasses produce the Faraday rotation effect and that the specific rotational capabilities of the cerium glasses vary essentially linearly with a concentration of the cerium ion. (See U.S. Pat. No. 3,711,264). However, many of these known glasses exhibiting the Faraday rotation effect are cumbersome and extremely difficult to fabricate, particularly on a large scale. Another common host glass system for Faraday rotation glasses is the heavy lead silicate. This system requires ceramic crucibles for melting. Consequently, the resulting glass is very inhomogeneous as the glass tends to attack the ceramic crucible. In addition, this attack may cause submicroscopic metallic or semimetallic inclusions within the host glass material. A second conventional system for Faraday rotation glasses is the terbium-aluminasilicate glasses. (See U.S. Pat. No. 3,484,152). These glasses require high melting temperatures and are very limited as to the size of the melt due to devitrification problems. Terbium metaphosphate glasses also require ceramic crucibles and also have a strong tendency toward devitrification. Rapid quenching of the melt of these glasses is essential and can only be achieved for specimens whose geometry allows the center of the glass specimen to cool rapidly. This necessarily limits the production of these glasses to thin discs. In addition, a wellcontrolled, reducing atmosphere is absolutely essential to obtain the proper valence of the cerium ions in the case of cerium metaphosphate glasses.

SUMMARY OF THE INVENTION

Accordingly, it is an object of the present invention to provide a glass material exhibiting the Faraday rotation effect which is easy to produce in relatively large quantities and in a wide choice of geometries.

Briefly, the invention in its broadest aspect comprises the formation of a Faraday rotation glass exhibiting a high Verdet constant and low susceptibility toward devitrification which consists essentially of the following constituents as expressed in weight percent:

| | |
|---|---|
| $SiO_2$ | 0–12 |
| $B_2O_3$ | 10–42 |
| Alkali metal oxide | 0–1 |
| Rare earth oxide | 25–57 |
| Alkaline earth oxide | 8–24 |
| $ZrO_2$ | 1–7 |
| $WO_3$ | 0–7 |
| $Al_2O_3$ | 0–2 |
| Fining Agent | 0–0.5 | where the alkaline earth oxide is selected from the group consisting of CaO, BaO, ZnO, and combinations thereof, the rare earth oxide is selected from the group consisting of $Tb_4O_7$ and the combination of $Tb_4O_7$ and $La_2O_3$, the $Tb_4O_7$ being present in an amount of at least 20 weight percent, and the alkali metal oxide being selected from the group consisting of $Na_2O$, $K_2O$, and combinations thereof.

Further objects, advantages, and features of the invention will be apparent from the details of the following specification.

DETAILED DESCRIPTION OF THE PREFERRED EMBODIMENTS

Glasses according to the present invention may be prepared in conventional glass makers' platinum crucibles using standard glass making techniques. The glasses of the present invention consist essentially of the constituents expressed in weight percent in the table above. The following table provides the composition in weight percent for nine glasses, examples A through I, according to the present invention, which exhibit the Faraday rotation effect and display a low susceptibility toward devitrification.

| | A | B | C | D | E | F | G | H | I | Range |
|---|---|---|---|---|---|---|---|---|---|---|
| $SiO_2$ | 4.7 | 2.4 | 6.0 | 7.8 | — | 5.4 | 5.5 | 11.7 | 5.5 | 0–12 |
| $B_2O_3$ | 34.6 | 40.1 | 40.5 | 36.8 | 37.9 | 39.8 | 40.0 | 11.7 | 40.0 | 10–42 |
| CaO | 0.4 | 5.8 | 17.3 | 13.5 | — | 9.4 | 9.1 | 1.6 | 9.1 | 0–18 |
| BaO | 13.7 | — | — | 5.7 | — | — | — | 17.2 | — | 0–18 |
| ZnO | — | 5.7 | — | 3.0 | 11.1 | — | — | — | — | 0–12 |
| $Tb_4O_7$ | 25.5 | 41.7 | 30.2 | 25.0 | 35.4 | 41.5 | 41.5 | 44.9 | 35.5 | 20–45 |
| $La_2O_3$ | 12.0 | — | — | 3.6 | 7.7 | — | — | 9.7 | 3.0 | 0–20 |
| $Al_2O_3$ | — | — | — | — | — | — | — | 1.6 | — | 0–2 |
| $ZrO_2$ | 3.0 | 4.3 | 6.0 | 4.6 | 4.5 | 3.7 | 3.9 | 1.6 | 3.9 | 1–7 |
| $Na_2O$ | 0.1 | — | — | — | — | 0.1 | — | — | — | 0–1 |
| $K_2O$ | — | — | — | — | — | 0.1 | — | — | — | 0–1 |
| $WO_3$ | 6.0 | — | — | — | 3.4 | — | — | — | 3.9 | 0–7 |
| Fining Agent | | | | | | | | | | 0–0.5 |

Various melts of the foregoing glasses may contain up to 0.5 weight percent of a typical fining agent such as $As_2O_3$ or $Sb_2O_3$ in order to combat problems with respect to bubble formation in the resulting glass.

The glass of Example G was prepared from a batch which consisted of 269.5 grams of glass making sand, 1960.0 grams of boron oxide, 796.25 grams of calcium carbonate, 2033.5 grams of terbium oxide and 191.1 grams of zirconium oxide. The batch as so composed was thoroughly mixed prior to melting. A platinum crucible having a capacity of approximately 2.5 liters was preheated in a standard electric furnace to a temperature of approximately 1482°C. The above defined batch was then transferred to the preheated crucible in portions of approximately 400 to 500 grams. After the batch was completely transferred, the temperature of the furnace was raised to approximately 1566°C to insure complete melting of the constituents. The temperature was then lowered to approximately 1371°C at which temperature the glass was stirred to homogenize the melt. After the stirrer was removed, the temperature was lowered to 1316°C to condition the melt. The resulting glass was cast into an iron mold preheated to approximately 482°C. The glass sample, so cast, together with the iron mold were transferred to an annealing furnace and annealed according to the standard techniques. The resulting glass has the following properties:

| | |
|---|---|
| Strain point | 645°C |
| Annealing point | 664°C |
| Softening point | 743°C |
| Density point | 3.80 grams/cm³ |
| Verdet Constant at 1.06 micrometers | 0.05 min/Oe-cm |

Other glasses according to the invention including those set forth in the table are formed under similar conditions.

One of the principal advantages of glasses according to the present invention is that the samples as cast from the melt, are not restricted to having a precise geometrical configuration. Therefore, the designer is more easily able to utilize the material to produce a polarization rotating device having specific required properties. That is, if a sample of glass is required to rotate the direction of polarization a specified number of degrees, that problem may be achieved, within space limitations, now by simply extending the length of the specimen of Faraday rotation glass. Since such samples may be readily constructed, the increased cost in producing such a device is minimal. In the prior art Faraday rotation glasses, one was required to gang a number of discs of the expensive and hard to produce Faraday rotation glass together or, to increase the strength of the magnetic field imposed upon the Faraday rotation glass. An increase in strength of the magnetic field does not, however, come inexpensively either in terms of cost or in space occupied by the equipment. Furthermore, the stronger the magnetic field utilized, the greater the extent and effect of this field within the remainder of the piece of equipment. Such strong magnetic fields can have detrimental effects upon various pieces of operating equipment. Therefore, the strength of the magnetic field which may be applied to Faraday rotation devices in many instruments is effectively limited.

The glasses here defined are based on a $SiO_2$—$B_2O_3$ glass system. These glasses have a high susceptibility for rare earth oxides. Therefore, an additional control on the Faraday rotation effect is achieved by the ability to vary the rare earth ion concentration widely within the glasses of the present invention.

In addition, the glasses may also be stabilized with respect to devitrification by the introduction of minor amounts of $WO_3$.

The range of temperatures required for melting and fining the glasses of the present invention allows the use of standard furnaces which are heated by silicon carbide resistance elements. Depending upon the specific composition chosen, the melting temperatures range from approximately 1475°C to over 1500°C. Typically, the refining temperatures should be chosen approximately 60°C higher than the melting temperatures and the casting temperatures are preferably 60° to 170°C lower than the melting temperature. The glasses are preferably cast into preheated molds and annealed.

The final column in the table above, provides the range of concentration for each of the individual constituents found in glasses according to the present invention. Preferably, the glasses according to the present invention should consist essentially of the following constituents as expressed in weight percent:

| | |
|---|---|
| $SiO_2$ | 0–12 |
| $B_2O_3$ | 10–42 |
| Alkali metal oxide | 0–1 |
| Alkaline earth oxide | 8–24 |
| Rare earth oxide | 25–57 |
| $ZrO_2$ | 1–7 |
| $WO_3$ | 0–7 |
| $Al_2O_3$ | 0–2 |
| Fining Agent | 0–0.5 | where the alkaline earth oxide is selected from the group consisting of CaO; the combination of CaO and BaO; the combination of CaO and ZnO; the combination of CaO, BaO, and ZnO; and ZnO which when present alone is in an amount of at least 10 weight percent, the rare earth oxide is selected from the group consisting of $Tb_4O_7$ and the combination of $Tb_4O_7$ and $La_2O_3$, the $Tb_4O_7$ being present in an amount in the range of 20 to 45 weight percent, the alkali metal oxide is selected from group consisting of $Na_2O$ and the combination of $Na_2O$ and $K_2O$, the fining agent is selected from the group consisting of $As_2O_3$, $Sb_2O_3$, and combinations thereof, when the amount of CaO present is less than 3 weight percent, $WO_3$ is required to be present, and the total amount of $Al_2O_3$ and $ZrO_2$ is at least 3 weight percent.

While there has been shown and described what are considered to be preferred embodiments of the present invention, it will be obvious to those skilled in the art that various changes and modifications may be made therein without departing from the invention as defined in the appended claims.

We claim:

1. A Faraday rotation glass exhibiting a high Verdet constant and low susceptibility toward devitrification consisting essentially of the following constituents as expressed in weight percent:

| | |
|---|---|
| $SiO_2$ | 0–12 |
| $B_2O_3$ | 10–42 |
| Alkali metal oxide | 0–1 |
| Rare earth oxide | 25–57 |
| Alkaline earth oxide | 8–24 |
| $ZrO_2$ | 1–7 |
| $WO_3$ | 0–7 |
| $Al_2O_3$ | 0–2 |
| Fining Agent | 0–0.5 | where the alkaline earth oxide is selected from the group consisting of CaO, BaO, ZnO, and combinations thereof, the rare earth oxide is selected from the group consisting of $Tb_4O_7$, and the combination of $Tb_4O_7$ and $La_2O_3$, the $Tb_4O_7$ being present in an amount of 20-45 weight percent, and the alkali metal oxide being selected from the group consisting of $Na_2O$, $K_2O$, and combinations thereof.

2. A Faraday rotation glass according to claim 1 wherein the constituents are present according to the following ranges as expressed in weight percent:

| | |
|---|---|
| $SiO_2$ | 0-12 |
| $B_2O_3$ | 10-42 |
| CaO | 0-18 |
| BaO | 0-18 |
| ZnO | 0-12 |
| $Tb_4O_7$ | 20-45 |
| $La_2O_3$ | 0-20 |
| $Al_2O_3$ | 0-2 |
| $ZrO_2$ | 1-7 |
| $Na_2O$ | 0-1 |
| $K_2O$ | 0-1 |
| $WO_3$ | 0-7 |
| $As_2O_3$ | 0-0.5 |
| $Sb_2O_3$ | 0-0.5 |

3. A Faraday rotation glass according to claim 2 wherein the constituents are present as follows as expressed in weight percent:

| | |
|---|---|
| $SiO_2$ | 5.5 |
| $B_2O_3$ | 40.0 |
| CaO | 9.1 |
| $Tb_4O_7$ | 41.5 |
| $ZrO_2$ | 3.9 |

4. A Faraday rotation glass according to claim 2 wherein the constituents are present as follows as expressed in weight percent:

| | |
|---|---|
| $SiO_2$ | 5.5 |
| $B_2O_3$ | 40.0 |
| CaO | 9.1 |
| $Tb_4O_7$ | 35.5 |
| $WO_3$ | 3.0 |
| $La_2O_3$ | 3.0 |
| $ZrO_2$ | 3.9 |

5. A Faraday rotation glass exhibiting a high Verdet constant and low susceptibility toward devitrification consisting essentially of the following constituents as expressed in weight percent:

| | |
|---|---|
| $SiO_2$ | 0-12 |
| $B_2O_3$ | 10-42 |
| Alkali metal oxide | 0-1 |
| Alkaline earth oxide | 8-24 |
| Rare earth oxide | 25-57 |
| $ZrO_2$ | 1-7 |
| $WO_3$ | 0-7 |
| $Al_2O_3$ | 0-2 |
| Fining Agent | 0-0.5 | where the alkaline earth oxide is selected from the group consisting of CaO; the combination of CaO and BaO; the combination of CaO and ZnO; the combination of CaO, BaO and ZnO; and ZnO which when present alone is in an amount of at least 10 weight percent, the rare earth oxide is selected from the group consisting of $Tb_4O_7$ and the combination of $Tb_4O_7$ and $La_2O_3$, the $Tb_4O_7$ being present in an amount in the range of 20 to 45 weight percent, the alkali metal oxide is selected from the group consisting of $Na_2O$ and the combination of $Na_2O$ and $K_2O$, the fining agent is selected from the group consisting of $As_2O_3$, $Sb_2O_3$, and combinations thereof, when the amount of CaO present is less than 3 weight percent, $WO_3$ is required to be present, and the total amount of $Al_2O_3$ and $ZrO_2$ is at least 3 weight percent.

* * * * *